United States Patent [19]

Farrah

[11] Patent Number: 5,730,284
[45] Date of Patent: Mar. 24, 1998

[54] DISCFOLDER

[76] Inventor: Ronald Peter Farrah, 5219 42nd St., NW., Washington, D.C. 20015

[21] Appl. No.: 570,519

[22] Filed: Dec. 11, 1995

[51] Int. Cl.$^6$ .................................................. B65D 85/57
[52] U.S. Cl. ..................... 206/308.3; 206/307; 206/472; 281/31
[58] Field of Search .................................. 206/307, 308.3, 206/232, 472, 473, 475; 281/31, 39

[56] References Cited

U.S. PATENT DOCUMENTS

| | | | |
|---|---|---|---|
| 3,592,381 | 7/1971 | Brody | 281/31 |
| 3,829,132 | 8/1974 | Willieme | 281/31 |
| 4,519,629 | 5/1985 | Podosek | 281/31 |
| 4,640,413 | 2/1987 | Kaplan et al. | 206/232 |
| 4,667,819 | 5/1987 | Lu | 206/308.3 |
| 4,765,466 | 8/1988 | Ivey | 206/472 |
| 4,928,828 | 5/1990 | Cohen | 206/308.3 |
| 5,031,772 | 7/1991 | Woodriff | 206/308.3 |
| 5,199,743 | 4/1993 | Rosinski, III | 206/308.3 |
| 5,275,438 | 1/1994 | Struhl | 206/232 |
| 5,288,144 | 2/1994 | Guderyon | 206/232 |
| 5,445,264 | 8/1995 | Uchida | 206/308.3 |

*Primary Examiner*—David T. Fidei
*Attorney, Agent, or Firm*—Fish & Richardson P.C.

[57] ABSTRACT

A paper or vinyl folder with a built-in disk folder include surfaces for holding the disk within the paper or vinyl folder to prevent the disk from being removed from the folder.

7 Claims, 3 Drawing Sheets

DISCFOLDER

FIELD OF THE INVENTION

The present invention describes a disk holder which is intended to be a part of a folder apparatus. More specifically, the present invention describes a disk and folder device which holds the disk inside the folder.

BACKGROUND AND SUMMARY OF THE INVENTION

The organization of information requires that information related to a particular subject be grouped together. This has been typically done by using files. When the information is in the form of paper, the paper is maintained within the file. However, more modern technology uses electronic information. The electronic information is stored in electronic media, for instance in a computer. A computer disk has become a common way to store information.

The information can be organized in directories on a local area network, or alternately can be organized on a disk. However, when the disk is placed within the paper file, it moves around, and may eventually fall out of the file.

The inventor recognized that modern information storage would benefit from a way to hold a disk within a file. It is accordingly an object of the present invention to meet this need. A file is made which includes internal surfaces allowing a holder for a disk. These internal surfaces include a disk-holding member, and possibly an opening which allows reading a label from the disk. It is another object of the present invention to form a file where the disk contents can be seen from outside of the file. This facilitates handling, since one can easily see whether or not there is a disk in the file.

The product of the present invention is preferably die-cut to form a letter or legal size folder together with a storage compartment for the computer disk. In various aspects of the invention, the disk can be removed by lifting a disk compartment from the slot and removing the disk. Alternately, the disk can be replaced and the tab inserted into the slot to make the entire unit integral. The unit can be differently folded to allow the disk to face the inside or outside of the folder.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
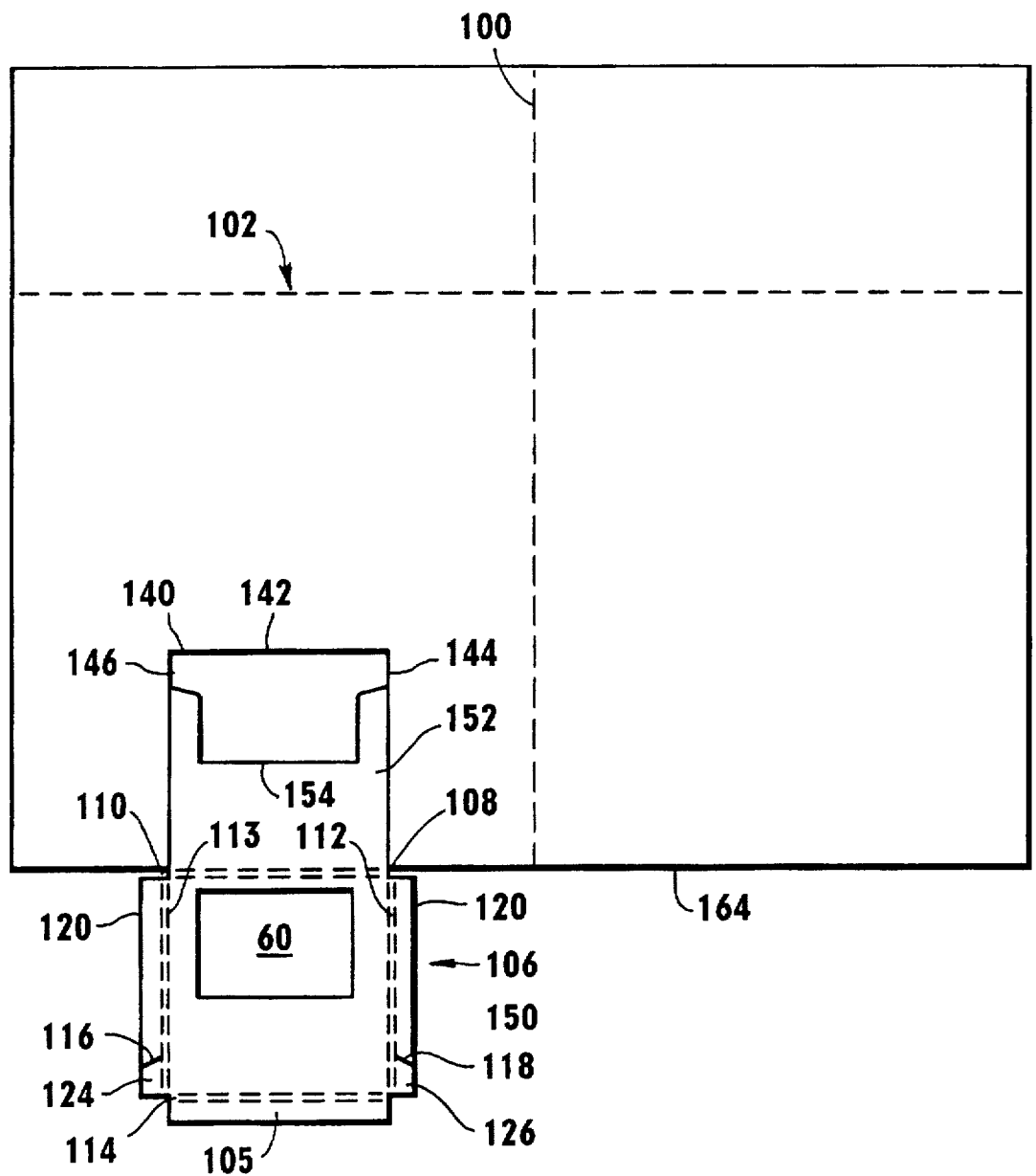
FIG. 1 shows a first embodiment of the invention using a tongue-held disk folder.

The embodiments of the invention describe preferred aspects of the invention herein, and will be separately described. A first embodiment of the invention is shown in FIG. 1. The folded material including the disk slot therein is shown in FIG. 1. It should be understood that the material forming the folder could be any commonly used folder material—including paper, vinyl or any other similar material. The preferred embodiment describes forming the folder of paper.

According to this embodiment, a sheet of appropriate material, such as hardened paper, oaktag or vinyl is die-cut and folded in specified ways. A first main fold 100 separates a left half of the folder from a right half of the folder. A letter size folder would end at the line 102.

The original material is cut at 104 around a disk holder section 106. The disk holder section 106 is folded on the line 108 to form the disk holder.

Disk holder section 106 is folded along line 108 and also along lines 110, 112 and 114. The element is also cut at the lines 116 and 118. Cuts are formed along the lines 120 and 122, to form the sides of the disk holding element. Folds along the lines 112 and 113 are made, followed by removal of the portions 120 and 122. This leaves tabs 124 and 126 at the side of the disk holding element, and a top tab 128.

Next the disk holding receiving portion of the folder is formed. The receiving portion is formed by first forming a cutout shown as the hatched portion 140 in FIG. 1. This cutout includes a top surface 142, and two side surfaces 144 and 146.

Now, the disk receiving portion 106 is folded along the line 108 to meet the cutout 140. The surfaces are aligned such that a first disk holding surface 150 faces against the second disk holding surface 152. The space between the surfaces 150 and 152 holds the disk. The end portion of the disk also extends out beyond the cutout line 154.

The pouch can be formed by folding the disk holding portion 106 in either direction, i.e., towards the inside or the outside of the folder. In either case, the portion 150 stays on one side of the abutting surface 152. The flap 124 folds beneath the surface 152, with the edge of the flap 124 abutting against edge 146. Similarly, flap 126 abuts against edge 144, and flap 128 abuts against edge 142.

The disk is hence held in the spaces between surfaces 150 and 152, but extends out above the line 154 so that it can be held.

An additional modification of this embodiment adds a viewing portion 160 which is formed from a cutout hole in the material. This cutout hole allows the label on the disk to be seen through the file. This allows viewing the disk without removing it from the file and/or disc holder.

Figure 2:
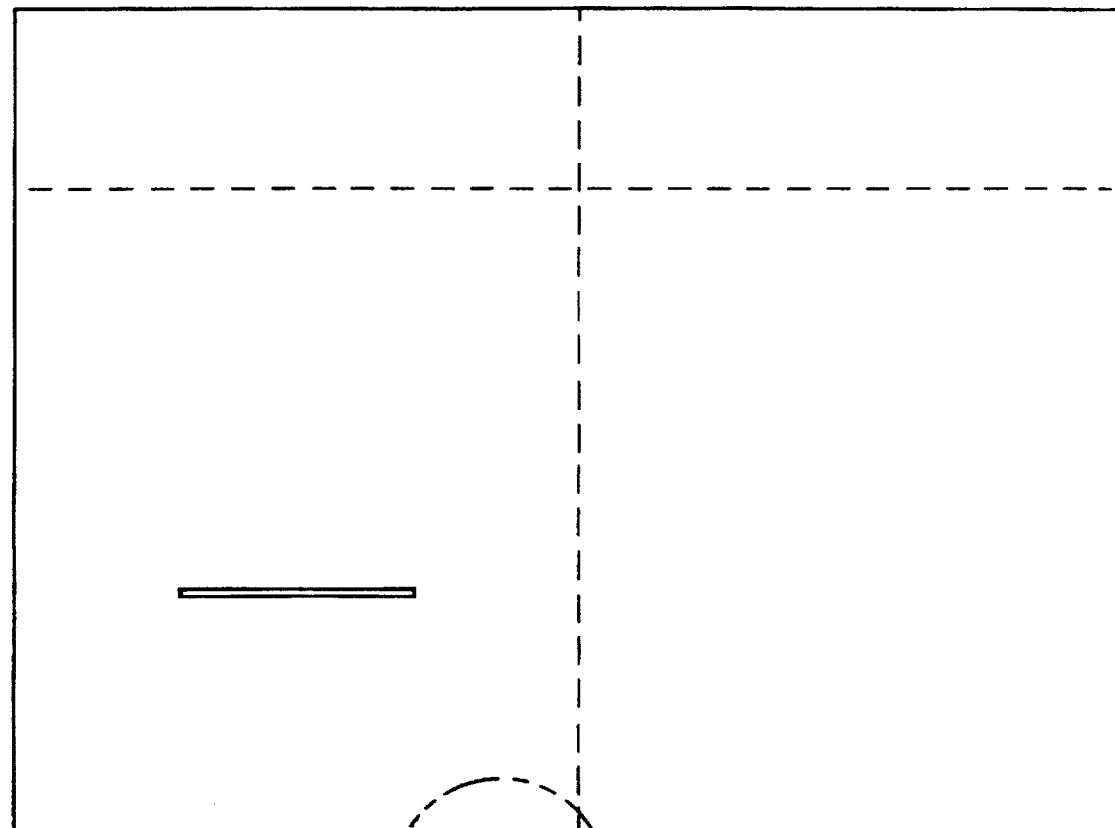
FIG. 2 shows a second embodiment of the invention using a slot-held disk folder.

The second embodiment is shown in FIG. 2. The FIG. 2 embodiment includes many common elements from the FIG. 1 embodiment, however uses a somewhat more complicated disk folding arrangement. The disk holder of FIG. 2 uses folded side pieces 200 and 202 which interconnect with one another by interconnecting slots 204. The slot 204 mates with slot 206, and the connection between surfaces holds the two sides together.

The disk is held within a disk holder in which all sides are folded elements. The top part of the disk is formed by tab 208, and the fold 210 in tab 208 holds the disk within the disk holding slot.

Figure 3:
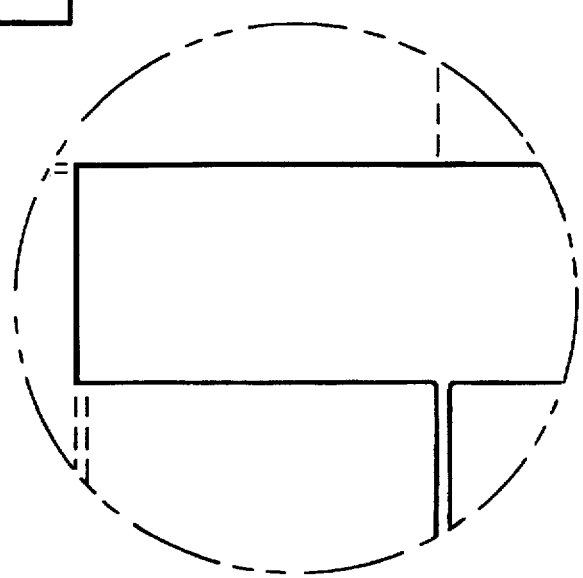
FIG. 3 shows a close-up of folding of the second embodiment.

FIG. 3 shows a close-up of the folding of FIG. 2. Each of the folding elements could be scores or scores and folds.

Figure 4:
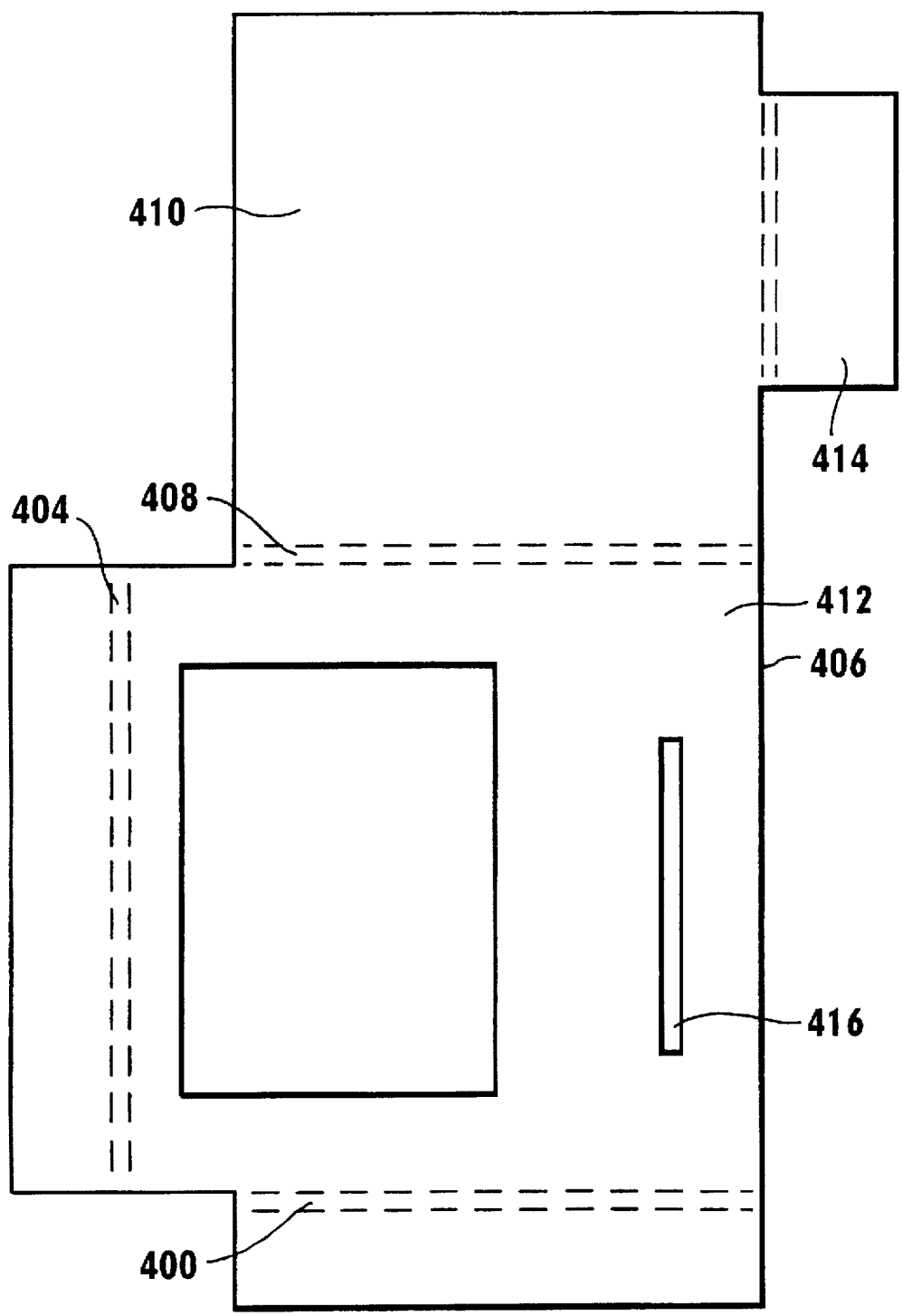
FIG. 4 shows a disk compartment used for attaching to a file.

An alternate, but somewhat less preferred embodiment, forms a separate disk holder which is folded and later becomes part of the folder, by gluing to the folder, or the like. The stand-alone disk folder is shown in FIG. 4. As in the previous embodiments, the disk is held within the folder, by various folds within the paper or vinyl. Here, the folded areas 400, 402 and 404 hold the disk in place. The disk is placed into the folder through the top portion 406.

The folded papers or vinyl are held together by taping or gluing, and the disk element is glued to the folder such that the rear portion 410 is held against the folder, and the front portion 412 faces the user. The disk is removed from the surface 406, by removing the flap 414 from the corresponding slot 416. Then the disk is pulled from the slot, and presented to the user.

The system is preferably formed by diecutting, scoring, folding and gluing.

Although only a few embodiments have been described in detail above, those having ordinary skill in the art will certainly understand theft many modifications are possible in the preferred embodiment without departing from the teachings thereof.

All such modifications are intended to be encompassed within the following claims.

What is claimed is:

1. A folder with an included disk area, comprising:

a sheet having first and second rectangular sections;

said second rectangular section, connected to said first rectangular section by a fold on a first edge of the first rectangular section, said fold allowing said first and second rectangular sections to move relative to one another to hold papers therewithin between a first surface of said first rectangular section and a second surface of said second rectangular section;

a disk holding section, extending from a second edge of said first rectangular section connected to said first rectangular section by a fold, said disk holding section including at least one disk holding panel, said first rectangular section including a slot therein, said disk holding section including at least one tab formed by a fold in a first of said at least one disk holding panel, said disk holding section being folded against said first rectangular section and said at least one tab being inserted into said slot to form a disk holding compartment to hold a disk relative to said first rectangular section.

2. A folder as in claim 1, further comprising surfaces defining an open portion on said disk holding element, said additional open portion forming a window on the disk holding element.

3. A folder as in claim 1, wherein said open portion is at a position of a disk label.

4. A folder as in claim 1, wherein said at least tab is held to said first surface of said first rectangular section by gluing.

5. A folder as in claim 1, wherein said disk is held between said disk holding section, and a second surface of said first section.

6. A folder as in claim 5, further comprising a plurality of tabs on said disk holding section inserted into said slot, said tabs held to said first surface of said first rectangular section to hold said disk holding section against said second surface of said first rectangular section surface.

7. A folder as in claim 1, said disk holding section further comprising second and third disk holding panels formed by folds in said disk holding section, said second and third disk holding panels attached to each other by interlocking slots.

* * * * *